United States Patent
Krasnov et al.

(10) Patent No.: US 6,713,987 B2
(45) Date of Patent: Mar. 30, 2004

(54) RECHARGEABLE BATTERY HAVING PERMEABLE ANODE CURRENT COLLECTOR

(75) Inventors: Victor Krasnov, Tarzana, CA (US); Kai-Wei Nieh, Monrovia, CA (US); Fan-Hsiu Chang, Miao-Li (TW); Chun-Ting Lin, Taichung (TW)

(73) Assignee: Front Edge Technology, Inc., Baldwin Park, CA (US)

( * ) Notice: Subject to any disclaimer, the term of this patent is extended or adjusted under 35 U.S.C. 154(b) by 0 days.

(21) Appl. No.: 10/087,423

(22) Filed: Feb. 28, 2002

(65) Prior Publication Data

US 2003/0160589 A1 Aug. 28, 2003

(51) Int. Cl.[7] .............................. H01M 6/32; H02J 7/00
(52) U.S. Cl. ........................................ 320/107; 429/118
(58) Field of Search .......................... 320/107; 429/118, 429/119, 162, 110, 116, 117; 29/623.1

(56) References Cited

U.S. PATENT DOCUMENTS

| | | | |
|---|---|---|---|
| 3,530,007 A | 9/1970 | Golubovic | 136/263 |
| 4,543,441 A | 9/1985 | Kumada et al. | 136/249 |
| 5,019,467 A | 5/1991 | Fujiwara | 429/127 |
| 5,338,625 A | 8/1994 | Bates et al. | |
| 5,445,906 A | 8/1995 | Hobson et al. | 429/162 |
| 5,512,147 A | 4/1996 | Bates et al. | 224/192.15 |
| 5,597,660 A | 1/1997 | Bates et al. | |
| 5,612,152 A | 3/1997 | Bates | 429/152 |
| 5,705,293 A | 1/1998 | Hobson | 429/162 |
| 5,705,297 A | 1/1998 | Warren | 429/244 |
| 6,168,884 B1 | 1/2001 | Neudecker et al. | 429/162 |
| 6,264,709 B1 * | 7/2001 | Yoon et al. | 29/623.5 |
| 6,280,875 B1 * | 8/2001 | Kwak et al. | 429/162 |
| 6,379,835 B1 * | 4/2002 | Kucherovsky et al. | 429/118 |
| 2001/0041294 A1 | 11/2001 | Chu et al. | |

FOREIGN PATENT DOCUMENTS

| | | |
|---|---|---|
| FR | 2 403 652 A | 4/1979 |
| JP | 59 226472 A | 12/1984 |
| JP | 2001 044073 A | 2/2001 |
| WO | WO 00 60689 A | 10/2000 |
| WO | WO 02 21627 A | 3/2002 |

OTHER PUBLICATIONS

Donald M. Mattox, Handbook of Physical Vapor Deposition (PVD) Processing, Film Formation, Adhesion, Surface Preparation and Contamination Control, 1998, pp. 127–135 and 343–364, Noyes Publications, Westwood, New Jersey, U.S.A.

Y. J. Park et al., "Characterization of tin oxide/LIMn2O4 thin–film cell," Journal of Power Sources, Jun. 2000, pp. 250–254, vol. 88, No. 2, Elsevier Science S.A.

(List continued on next page.)

Primary Examiner—Pia Tibbits
(74) Attorney, Agent, or Firm—Ashok K. Janah

(57) ABSTRACT

A rechargeable battery has a battery cell at least partially enclosed by a casing. The battery cell comprises (1) a substrate; (2) a cathode and cathode current collector on the substrate, the cathode being electrically coupled to the cathode current collector; (3) an electrolyte electrically coupled to the cathode or cathode current collector; and (4) a permeable anode current collector having a first surface electrically coupled to the electrolyte and an opposing second surface, the permeable anode current collector: (1) having a thickness that is less than about 1000 Å and that is sufficiently small to allow cathode material to permeate therethrough to form an anode on the opposing second surface of the permeable anode current collector when the battery cell is electrically charged, and (2) that is absent an overlayer on the opposing second surface of the anode current collector. Positive and negative terminals are electrically connected to the battery cell. The permeable anode current collector may be a grid with perforations.

29 Claims, 2 Drawing Sheets

OTHER PUBLICATIONS

Roh N–S, et al., "Effects of deposition condition on the ionic conductivity and structure of amorphous lithium phosphorus oxynitrate thin film" Scripta Materialia, Dec. 17, 1999, pp. 43–49, vol. 42, No. 1, Elsevier, New York, NY, US.

Bolster M–E, et al. "Investigation of lithium intercalation metal oxides for thermal batteries" Proceedings of the International Power Sources Symposium, Cherry Hill, Jun. 25–28, 1990; Jun. 25, 1990, pp. 136–140, vol. SYMP. 34, IEEE, New York, US.

Wagner A V, et al. "Fabrication and testing of thermoelectric thin film devices" Fifteenth Interantional Conference on Thermoelectrics, Pasadena, CA, USA Mar. 26–29, 1996; pp. 269–273, IEEE, New York, US.

U.S. Provisional Patent Application entitled, "Comprehensive Patent for the Fabrication of a High Volume, Low Cost Energy Products Such as Solid State Lithium Ion Rechargeable Battery, Supercapacitators and Fuel Cells"; filed Mar. 24, 2000; Ser. No. 60/191,774, Inventors: Jenson, et al.

U.S. Provisional Patent Application entitled, "Apparatus and Method for Rechargeable Batteries and for Making and Using Batteries", filed Aug. 14, 2000; Ser. No. 60/225,134, Inventor: Jenson.

U.S. Provisional Patent Application entitled, "Battery Having Ultrathin Electrolyte", filed Oct. 6, 2000, Ser. No. 60/238,673, Inventor: Jensen, et al.

Bates, J.B., et al., "Preferred Orientation of Polycrystalline $LiCoO2$ Films" *Journal of Electrochemical Society*; Issue No. 147 (1) pp. 59–70 (Mar. 23, 2000).

Neudecker, et al., "Lithium–Free Thin–Film Battery with In–Situ Plated Li Anode", *Journal of the Electrochemical Society*; Issue No. 147(2) 517–523 (Jun. 7, 2000).

\* cited by examiner

RECHARGEABLE BATTERY HAVING PERMEABLE ANODE CURRENT COLLECTOR

BACKGROUND

Embodiments of the present invention relate to a rechargeable battery and methods of manufacturing the same.

A rechargeable thin film battery typically comprises a substrate having thin films that cooperate to store and release electrical charge. Thin-film batteries typically have a thickness that is less than about 1/100th of the thickness of conventional batteries, for example, a thickness of less than about 0.5 mm. The thin films may be formed on the substrate by conventional fabrication processes, such as for example, physical or chemical vapor deposition (PVD or CVD), oxidation, nitridation, electron beam evaporation, and electroplating processes. The thin films typically include cathode, electrolyte, anode, and current collector films. When the rechargeable battery is charged, ions formed of the cathode material pass from the cathode through the electrolyte to the anode, and when the battery is discharged these ions travel back from the anode through the electrolyte to the cathode. For example, in batteries having a cathode comprising lithium, such as a $LiCoO_2$ or $LiMnO_2$ cathode, lithium species originating from the lithium-containing cathode travel from the cathode to the anode and vice versa during the charging and discharging cycles, respectively.

Several types of anodes are commonly used for lithium cathode batteries. The first anode type is made from a material that accepts lithium ions, such as tin oxide. The lithium ions travel into and out of the anode during charging and discharging of the battery. However, such anode materials can often consume, irreversibly, between 40 to 60% of the lithium of the cathode. It is undesirable to consume such large amounts of the lithium during charging and discharging of the battery as this limits the energy storage capacity of the battery.

Another type of anode comprises a lithium layer upon which, during charging, lithium material from the cathode deposits upon and gradually builds up. The original lithium anode provides nucleation sites for the cathode generated lithium material and accommodates the stresses that result from the deposition and removal of the lithium material. However, the lithium layer typically deteriorates when exposed to air, which complicates fabrication of the battery. Also, the battery cannot always be assembled using common metal joining processes, such as solder re-flow, because of the low melting temperature of lithium (181° C.).

Yet another type of battery, commonly known as the lithium-anode-free battery is fabricated with only a layer of metal as a current collector and without a preformed lithium anode. Instead, a lithium anodic film is formed at the interface of the current collector and the electrolyte of the battery during the first charge-up cycle of the battery. Thereafter, during subsequent charge and discharge cycles, the battery operates with the lithium anodic film that is generated from the initial charge-up cycle. However, the in-situ generated lithium anodic film is often non-uniform in thickness resulting in the generation of stresses in the battery. The formation and dissociation of lithium at the cathode current collector/electrolyte interface during the charging and discharging cycles can cause the anode current collector to separate from the electrolyte. Also, the non-uniform thickness of in-situ formed lithium anode and the separation of the cathode current collector from the electrolyte lead to a gradual decrease in the energy storage capacity and an increase in the leakage current over multiple charging and discharging cycles.

The long-term performance of the Li-free battery over multiple cycles may be improved by forming an overlayer of parylene or LiPON over the anode current collector. The overlayer has been found to reduce the gradual loss of energy storage capacity over multiple battery cycles, as for example, described by Neudecker et. al. in U.S. Pat. No. 6,168,884 and in the Journal of the Electrochemical Society, 147 (2), 517–523 (2000), both of which are incorporated herein by reference in their entireties. Such a battery consists of a cathode, an electrolyte film, an anode current collector and the overlying layer of parylene or LiPON on the anode current collector. During each charge and discharge cycle in which the lithium anode film is formed and then gradually dissipated, the anode current collector along with the overlying layer is lifted up from, or set down onto, the electrolyte layer. This process becomes reversible only when an overlying film is deposited onto the anode current collector, and without the overlying layer, the battery suffers a loss of capacity with increasing cycles. However, even such types of batteries develop stresses arising from the non-uniform thickness of the lithium anode that often results in a path for current leakage. Also, the deposition of the overlying layer increases the cost of the battery and the extra layer reduces the energy density factor of the battery—which is the energy stored per unit volume of the battery.

Thus it is desirable to provide a rechargeable battery that maintains good energy storage capacity after numerous charge and discharge cycles. It is further desirable for the rechargeable battery to maintain its structural integrity after a number of charging and discharging cycles. It is also desirable to have a lithium-anode-free battery that can maintain its properties over numerous cycles, without losing its structural integrity, and while still having a good energy density factor.

SUMMARY

A rechargeable battery has a battery cell at least partially enclosed by a casing. The battery cell comprises (1) a substrate; (2) a cathode and cathode current collector on the substrate, the cathode being electrically coupled to the cathode current collector; (3) an electrolyte electrically coupled to the cathode or cathode current collector; and (4) a permeable anode current collector having a first surface electrically coupled to the electrolyte and an opposing second surface, the permeable anode current collector: (1) having a thickness that is less than about 1000 Å and that is sufficiently small to allow cathode material to permeate therethrough to form an anode on the opposing second surface of the permeable anode current collector when the battery cell is electrically charged, and (2) that is absent an overlayer on the opposing second surface of the anode current collector. Positive and negative terminals are electrically connected to the battery cell.

A rechargeable battery comprises (a) a casing; (b) a battery cell at least partially enclosed by the casing, the battery cell comprising: (1) a substrate, (2) a cathode and cathode current collector on the substrate, the cathode being electrically coupled to the cathode current collector, (3) an electrolyte electrically coupled to the cathode or the cathode current collector, and (4) a permeable anode current collector having a first surface electrically coupled to the electrolyte and an opposing second surface, the permeable anode current collector comprising a grid having perforations that allow cathode material to pass through the perforations to form an anode on the second surface or in the perforations when the battery cell is electrically charged; and (c) positive and negative terminals that electrically connect to the battery cell.

A method of forming a rechargeable battery comprises:
(a) forming a battery cell by the steps of:
  (1) forming a substrate,
  (2) forming a cathode and cathode current collector on the substrate, the cathode being electrically coupled to the cathode current collector,
  (3) forming an electrolyte electrically coupled to the cathode or the cathode current collector, and
  (4) forming a permeable anode current collector having a first surface electrically coupled to the electrolyte and an opposing second surface, the permeable anode current collector having (1) a thickness that is less than about 1000 Å and that is sufficiently small to allow cathode material to permeate therethrough to form an anode on the second surface of the permeable anode current collector when the battery cell is electrically charged, and (2) absent an overlayer on the second opposing surface;
(b) connecting positive and negative terminals to the battery cell; and
(c) enclosing the battery cell at least partially within a casing.

A method of forming a rechargeable battery comprises:
(a) forming a battery cell by the steps of:
  (1) forming a substrate,
  (2) forming a cathode and cathode current collector on the substrate, the cathode being electrically coupled to the cathode current collector,
  (3) forming an electrolyte electrically coupled to the cathode or the cathode current collector, and
  (4) forming a permeable anode current collector having a first surface electrically coupled to the electrolyte and a second opposing surface, the permeable anode current collector comprising a grid having perforations that allow cathode material to pass through the perforations to form an anode on the second surface of the anode current collector or in the perforations when the battery cell is electrically charged;
(b) connecting positive and negative terminals to the battery cell; and
(c) enclosing the battery cell at least partially within a casing.

DRAWINGS

These features, aspects, and advantages of the present invention will become better understood with regard to the following description, appended claims, and accompanying drawings which illustrate examples of the invention. However, it is to be understood that each of the features can be used in the invention in general, not merely in the context of the particular drawings, and the invention includes any combination of these features, where:

DESCRIPTION

Figure 1:
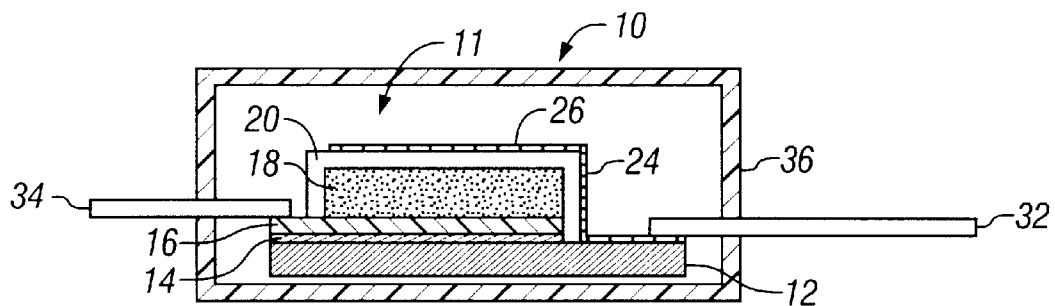
FIG. 1 is a schematic cross-sectional view of an embodiment of a thin film rechargeable battery according to the present invention, in a discharged state.

An embodiment of a rechargeable battery 10 having features of the present invention is illustrated in FIG. 1. The battery 10 comprises a battery cell 11 that is formed on a substrate 12 and is at least partially enclosed by a casing 36. The casing 36 may enclose a single battery cell 11 (as shown) or a number of battery cells (not shown) that are electrically connected to one another in a series or parallel arrangement. Positive and negative terminals 34, 32, respectively, are electrically connected to the battery cell 11, or to the plurality of battery cells, and may extend through the casing 36.

The substrate 12 may be an insulator, a semiconductor, or a conductor. For example, the substrate 12 may comprise an oxide such as aluminum oxide or silicon dioxide, a metal such as titanium or stainless steel, a semiconductor such as silicon, or a polymer. In one embodiment, the substrate 12 comprises mica, a muscovite material. The substrate 12 should also have a relatively smooth surface and sufficient mechanical strength to support the thin films during processing of the films and at battery operational temperatures.

A first adhesion layer 14 may be deposited on the substrate 12 to improve adhesion of the other films formed on the substrate 12. The adhesion layer 14 can comprise a metal such as, for example, titanium, cobalt, aluminum, other metals, or a ceramic material such as, for example, $LiCoO_x$, which may comprise a stoichiometry of $LiCoO_2$. A cathode current collector film 16 may be deposited over the adhesion layer 14. The cathode current collector film 16 is typically a conductive layer that may comprise a non-reactive metal such as silver, gold, platinum or aluminum. The cathode current collector film 16 may also comprise the same metal as the adhesion layer 14 in a thickness that is sufficiently high to provide the desired electrical conductivity.

A cathode 18 comprising an electrochemically active material may be formed over or below the cathode current collector film 16, so that the cathode current collector film 16 and cathode 18 are electrically coupled together. For example, the cathode 18 may comprise one of several lithium containing compounds that may be deposited in thin-film form, such as crystalline $LiMn_2O_2$, $LiNiO_2$, $LiMn_2O_4$, $LiMnO_2$, or $LiCoO_2$. In one exemplary embodiment, a crystalline $LiCoO_2$ film is deposited upon the cathode current collector 16 by RF or DC magnetron sputtering to serve as the cathode 18. The cathode 18 typically has a thickness of from about 0.1 $\mu$m to about 10 $\mu$m, such as about 4 $\mu$m.

An electrolyte 20, such as comprising a solid inorganic material, is formed over the cathode 18. The electrolyte 20 may be, for example, an amorphous lithium phosphorus oxynitride film otherwise known as a LiPON film. In one embodiment, the LiPON is of the form $Li_xPO_yN_z$ in an x:y:z ratio of about 2.9:3.3:0.46. The electrolyte 20 may have a thickness of from about 0.1 $\mu$m to about 5 $\mu$m, such as about 2 $\mu$m.

A permeable anode current collector 24 is deposited over the electrolyte 20. The permeable anode current collector 24 may comprise a metal, such as Sc, Ti, V, Cr, Mn, Fe, Co, Ni, Cu, Y, Zr, La, Hf, Ta, Mo, or alloys thereof. In a typical embodiment, the permeable anode current collector 24 comprises copper. The permeable anode current collector 24 comprises a thickness that is sufficiently small to allow atoms of the cathode material (which may be atoms, ions or other species of the cathode material), such as lithium atoms, to permeate through its thickness. For example, a suitable thickness of the permeable anode current collector 24 is less than about 1000 Å. It is believed that the atoms of the cathode material permeate through the grains, grain boundaries, or pin-holes of the permeable anode current collector 24. In one embodiment, the permeable anode current collector 24 has a thickness of less than about 500 Å that further reduces loss of energy storage capacity with multiple charge and discharge cycles. The permeable anode current collector 24 may also have a thickness of at least about 50 Å to prove better cycle properties.

The permeable anode current collector 24 comprises an exposed outer surface 26 that faces away from the electrolyte 20 and that is absent an overlayer. In the prior art, it was determined that an overlayer is needed to minimize the drop in energy storage capacity over multiple charge-up and discharge cycles, as previously described. However, it has been discovered that when the anode current collector 24 is sufficiently thin to be permeable to migrating lithium species and yet provide sufficient electronic conductivity, the drop in energy storage capacity during charge-up and discharge cycles is significantly reduced.

Figure 3:
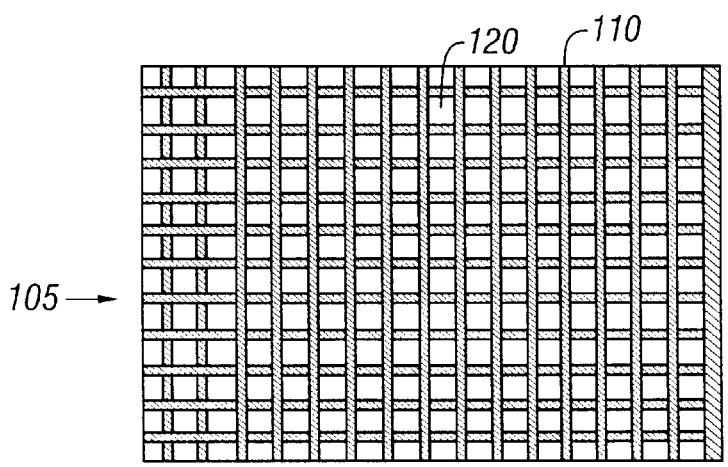
FIG. 3 is a top view of a permeable anode current collector comprising a grid pattern.

In another version, the permeable anode current collector 24 comprises a grid 105, as shown in FIG. 3. The grid 105 that is electrically conductive and that has perforations 120 to allow the lithium cathode material to permeate therethrough. In one version, the grid is a fine metal patterned mesh 110. When charging the battery 10, the cathode material is able to pass through the perforations of the grid pattern 105. For example, a ratio of the area of the perforations to the total area of the grid pattern 105 may be at least about 90% to allow the lithium to permeate the permeable anode current collector 24. As an example, the grid 105 can have perforations having a dimension sized at least about 0.1 mm and less than about 3 mm.

Figure 2:
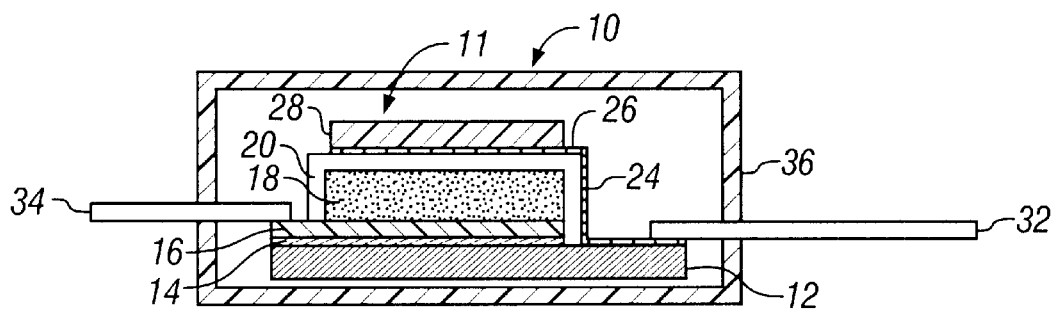
FIG. 2 is a schematic cross-sectional view of the thin film rechargeable battery of FIG. 1, in a charged state.
Figure 4:
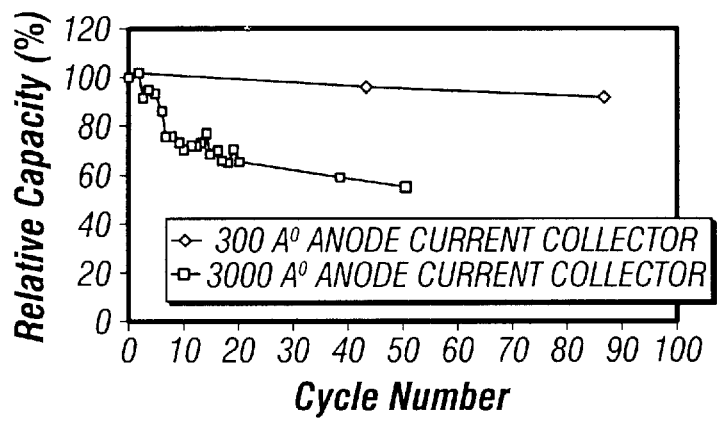
FIG. 4 shows plots of discharge capacity vs. cycle number for a battery with a 300 Å thick anode current collector and a battery with a 3000 Å thick anode current collector.

The cathode material thus permeates the permeable anode current collector 24 and forms an anode film 28 on its outer surface 26. By forming the anode film 28 on the outer surface 26 of the permeable anode current collector 24 rather than between the electrolyte 20 and the permeable anode current collector 24, repeated charging and discharging of the battery 10 exerts less stress on the electrolyte 20 and the permeable anode current collector 24, and less damage occurs to the interface between the electrolyte 20 and the permeable anode current collector 24. As can be seen in FIG. 2, after charging, the permeable anode current collector 24 remains substantially fixed relative to the electrolyte 20. When the battery 10 is discharged, the cathode material permeates the permeable anode current collector 24 in the reverse direction and returns to the cathode 18. FIG. 4 shows plots of the discharge capacity vs. cycle number for a battery with a 300 Å thick permeable current collector, and a battery with a current collector that is 3000 Å thick are shown. The energy storage capacity of the battery with the 3000 Å thick current collector lost about 40% after 40 cycles. On the contrary, there was less than 10% capacity drop for the battery with the thin 300 Å current collector after 90 cycles. The surface of the thick current collector after such cycling was copper colored and was a rough surface as visible under a scanning electron microscope, while the surface of the thin current collector had the color of lithium after cycling and was much smoother.

In an electrically charged state, as shown in FIG. 2, the anode film 28 is formed on the outer surface 26. In an electrically discharged state, as shown in FIG. 1, the anode film 28 is dissipated. In one embodiment, the permeable anode current collector 24 is sufficiently thin to allow the rechargeable battery 10 to be charged and discharged at least about 100 times between about 4.2 V and about 3 V without a substantial loss of charging capacity of the rechargeable battery 10.

Typically, the thin film battery 10 is manufactured in its discharged state, substantially absent an anode film 28. In the initial step, step 100, the substrate 12 is heated, such as to about 400° C. in air for about 10 minutes, to clean the substrate 12 by burning off organic materials which may be formed on the substrate 12. Subsequently, the thin film layers of the battery 10, such as the cathode current collector 16, cathode 18, electrolyte 20, and permeable anode current collector 24, are deposited on the substrate 12.

Figure 5:
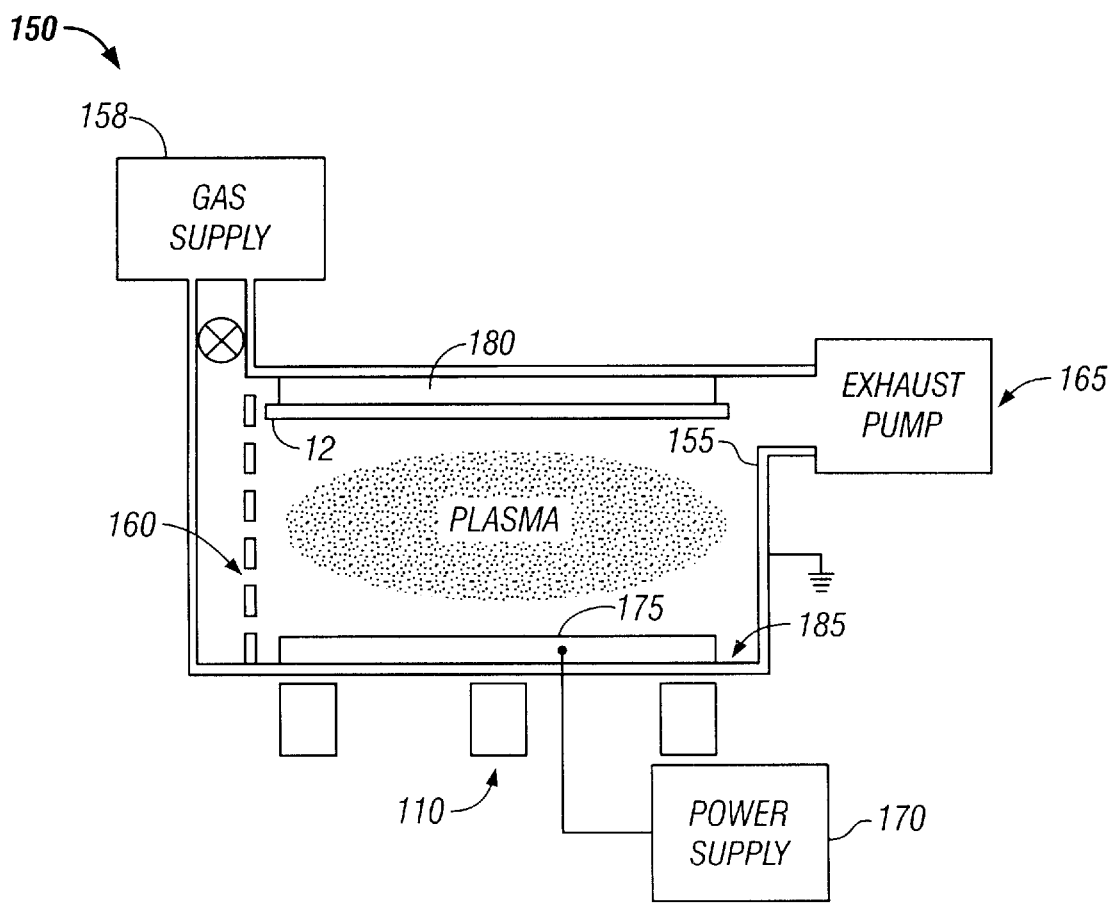
FIG. 5 is a schematic diagram of the structure of a cathode forming apparatus.

In one method, the substrate 12 undergoes sputtering in a magnetron PVD chamber 150 as shown in FIG. 5. The chamber 150 comprises walls 155, a gas supply 158 connected to a gas distributor 160 to introduce a process gas into the chamber 150, a gas exhaust 165 to exhaust gas from the chamber 150, and a power supply 170 to apply a power to a sputtering target 175 in the chamber. The process gas may comprise, for example, argon and oxygen. A substrate fixture 180 with the substrate 12 thereon is carried into the chamber 150 by a conveyor (not shown) and positioned facing the target 175. The substrate holding fixture 180 is electrically isolated from the chamber walls 155, which are typically electrically grounded. The chamber 150 is separated from a loading chamber (not shown) by a slit valve (also not shown). The sputtering gas is typically maintained in the chamber 150 at a pressure of from about 5 to about 25 mTorr, and provided at a flow rate ratio of $Ar/O_2$ of from about 1 to about 45.

A magnetron sputtering energizer 185 is provided to energize the process gas and sputter material from the target 175, thereby generating a plasma. The plasma is formed over an area that is sufficiently large to coat the entire substrate 12. In one version, the magnetron energizer 185 further comprises magnets 110, such as peripheral and central magnets, to control the distribution of plasma ions about the substrate 12. To deposit a film of $LiCoO_x$ on the substrate 12, a target 175 comprising $LiCoO_2$ is installed in the chamber 150 and the magnetron sputtering energizer 185 is operated at a power density level of from about 0.1 to about 20 W/cm$^2$. In conjunction with operating the energizer 185, an ion flux of from about 0.1 to about 5 mA/cm$^2$ is delivered to the substrate 12 upon which the $LiCoO_x$ film is being deposited. During deposition, a negative potential of 5 to 100 V on the substrate 12 is established with respect to the plasma. The potential can be established either by using an external power supply or by electrically floating the substrate holding fixture 180. The parameters of the deposition process are maintained until the desired film thickness is reached. The temperature of the substrate 12 during the deposition process is estimated to be from about 100 to about 200° C.

Optionally, the cathode 18 formed on the substrate 12 may be annealed to further improve the quality of the cathode 18. The annealing step has @ been found to increase the battery's charging capacity by 10 to 20%, increase the charge and discharge current by more than 50%, and improve the resistance to moisture. These attributes arise from the elimination of point defects and the reduction of electrical contact resistances in the cathode material. The annealing process is typically performed at a low temperature of from about 150 to about 600° C.

The battery cell 11 is then at least partially enclosed in a casing that is fabricated from gas barrier materials, such as a metal foil, metalized plastic foil, or thin ceramic materials such as Mica. In one version, a gap is provided between the casing and the battery cell 11. The casing is either pumped out to form a vacuum environment therein, or is filled with a gas that is absent moisture, such as a non-reactive gas, for example nitrogen, argon, or dry air. When a single cell 11 is in the casing, the positive terminal 34 is electrically connected to the cathode current collector 16 of the cell 11, and the negative terminal 32 is electrically connected to the anode current collector 24 of the battery cell 11. When a number of cells 11 placed in the casing, the cells 11 can be electrically connected in a series or parallel cell arrangement.

Although the present invention has been described in considerable detail with regard to certain preferred versions thereof, other versions are possible. For example, the present invention could also be used in a disposable or single-use battery. Thus, the appended claims should not be limited to the description of the preferred versions contained herein.

What is claimed is:

1. A rechargeable battery comprising:
   (a) a casing;
   (b) a battery cell at least partially enclosed by the casing, the battery cell comprising:
      (1) a substrate,
      (2) a cathode and cathode current collector on the substrate, the cathode being electrically coupled to the cathode current collector,
      (3) an electrolyte electrically coupled to the cathode or cathode current collector, and
      (4) a permeable anode current collector having a first surface electrically coupled to the electrolyte and an opposing second surface, the permeable anode current collector: (1) having a thickness that is less than about 1000 Å and that is sufficiently small to allow cathode material to permeate therethrough to form an anode on the second surface of the permeable anode current collector when the battery cell is electrically charged, and (2) that is absent an overlayer on the opposing second surface of the anode current collector; and
   (c) positive and negative terminals that electrically connect to the battery cell.

2. A rechargeable battery according to claim 1 comprising a gap between the permeable anode current collector and the casing.

3. A rechargeable battery according to claim 2 wherein the gap comprises a gas or vacuum.

4. A rechargeable battery according to claim 3 wherein the gas comprises argon or dry air.

5. A rechargeable battery according to claim 1 comprising a plurality of battery cells that are electrically connected in a series or parallel arrangement.

6. A rechargeable battery according to claim 1 wherein the cathode comprises lithium.

7. A rechargeable battery according to claim 1 wherein the permeable anode current collector comprises a thickness that is sufficiently thin to allow the battery cell to be charged and discharged from between about 4.2 Volts and about 3 Volts, respectively, at least about 100 times, without a loss of energy storage capacity of more than about 20% relative to the initial energy storage capacity of the battery cell.

8. A rechargeable battery according to claim 1 wherein the permeable anode current collector comprises a thickness of less than about 500 Å.

9. A rechargeable battery according to claim 8 wherein the permeable anode current collector comprises a thickness of at least about 50 Å.

10. A rechargeable battery according to claim 1 wherein the permeable anode current collector comprises a grid.

11. A rechargeable battery according to claim 1 wherein the permeable anode current collector comprises copper.

12. A rechargeable battery comprising:
    (a) a casing;
    (b) a battery cell at least partially enclosed by the casing, the battery cell comprising:
       (1) a substrate,
       (2) a cathode and cathode current collector on the substrate, the cathode being electrically coupled to the cathode current collector,
       (3) an electrolyte electrically coupled to the cathode or the cathode current collector, and
       (4) a permeable anode current collector having a first surface electrically coupled to the electrolyte and an opposing second surface, the permeable anode current collector comprising a grid having perforations that allow cathode material to pass through the perforations to form an anode on the second surface or in the perforations when the battery cell is electrically charged; and
    (c) positive and negative terminals that electrically connect to the battery cell.

13. A rechargeable battery according to claim 12 absent an overlayer deposited on the grid of the permeable anode current collector.

14. A rechargeable battery according to claim 12 comprising a gap between the permeable anode current collector and the casing.

15. A rechargeable battery according to claim 14 wherein the gap comprises a gas or vacuum.

16. A rechargeable battery according to claim 12 comprising a plurality of battery cells that are electrically connected in a series or parallel arrangement.

17. A rechargeable battery according to claim 12 wherein the cathode comprises lithium.

18. A method of forming a rechargeable battery, the method comprising:
    (a) forming a battery cell by the steps of:
       (1) forming a substrate,
       (2) forming a cathode and cathode current collector on the substrate, the cathode being electrically coupled to the cathode current collector,
       (3) forming an electrolyte electrically coupled to the cathode or the cathode current collector, and
       (4) forming a permeable anode current collector having a first surface electrically coupled to the electrolyte and an opposing second surface, the permeable anode current collector having (1) a thickness that is less than about 1000 Å and that is sufficiently small to allow cathode material to permeate therethrough to form an anode on the second surface of the permeable anode current collector, and (2) absent an overlayer on the second opposing surface when the battery cell is electrically charged;
    (b) connecting positive and negative terminals to the battery cell; and
    (c) enclosing the battery cell at least partially within a casing.

19. A method according to claim 18 wherein (b) comprises placing the battery cell in the casing to form a gap between the permeable anode current collector and the casing.

20. A method according to claim 19 comprising evacuating the gap to form a vacuum environment in the gap.

21. A method according to claim 19 comprising filling the gap with a gas.

22. A method according to claim 18 absent a step of depositing an overlayer on the permeable anode current collector.

23. A method according to claim 18 wherein (b) comprises placing a plurality of battery cells in the casing and electrically connecting the battery cells in a series or parallel arrangement.

24. A method according to claim 18 comprising forming a cathode comprising lithium.

25. A method according to claim 19 comprising forming a permeable anode current collector comprising a grid.

26. A method of forming a rechargeable battery, the method comprising:
  (a) forming a battery cell by the steps of:
    (1) forming a substrate,
    (2) forming a cathode and cathode current collector on the substrate, the cathode being electrically coupled to the cathode current collector,
    (3) forming an electrolyte electrically coupled to the cathode or the cathode current collector, and
    (4) forming a permeable anode current collector having a first surface electrically coupled to the electrolyte and a second opposing surface, the permeable anode current collector comprising a grid having perforations that allow cathode material to pass through the perforations to form an anode on the second surface of the anode current collector or in the perforations when the battery cell is electrically charged;
  (b) connecting positive and negative terminals to the battery cell; and
  (c) enclosing the battery cell at least partially within a casing.

27. A method according to claim 26 wherein (b) comprises placing the battery cell in the casing to form a gap between the permeable anode current collector and the casing.

28. A method according to claim 26 absent a step of depositing an overlayer on the permeable anode current collector.

29. A method according to claim 26 comprising forming perforations in the grid that have a dimension sized at least about 0.1 mm and less than about 3 mm.

* * * * *